(12) United States Patent
Gao

(10) Patent No.: US 8,919,478 B2
(45) Date of Patent: Dec. 30, 2014

(54) BICYCLE DRIVE UNIT

(71) Applicant: Shimano Inc., Osaka (JP)

(72) Inventor: Jun Gao, Osaka (JP)

(73) Assignee: Shimano Inc., Osaka (JP)

(*) Notice: Subject to any disclaimer, the term of this patent is extended or adjusted under 35 U.S.C. 154(b) by 87 days.

(21) Appl. No.: 13/859,904

(22) Filed: Apr. 10, 2013

(65) Prior Publication Data
US 2014/0305727 A1 Oct. 16, 2014

(51) Int. Cl.
*B62M 6/55* (2010.01)
(52) U.S. Cl.
CPC ....................................... *B62M 6/55* (2013.01)
USPC ....................................................... 180/206.4
(58) Field of Classification Search
CPC ............ B62M 6/55; B62M 6/45; B62M 6/60; B62M 6/65
USPC .................................. 180/206.4, 206.6, 206.1
See application file for complete search history.

(56) References Cited

U.S. PATENT DOCUMENTS

| | | | | |
|---|---|---|---|---|
| 3,884,317 A * | 5/1975 | Kinzel | ........................... | 180/220 |
| 6,012,538 A * | 1/2000 | Sonobe et al. | ................. | 180/220 |
| 6,270,438 B1 * | 8/2001 | Liao | ................................... | 475/4 |
| 6,672,418 B1 * | 1/2004 | Makino | ....................... | 180/206.3 |
| 7,766,114 B2 * | 8/2010 | Lee et al. | .................... | 180/206.4 |
| 8,794,368 B2 * | 8/2014 | Gu et al. | ..................... | 180/206.4 |
| 2011/0183794 A1 * | 7/2011 | Chan | ............................... | 474/70 |

* cited by examiner

*Primary Examiner* — Tony Winner
(74) *Attorney, Agent, or Firm* — Global IP Counselors

(57) ABSTRACT

In accordance with a first aspect, a bicycle drive unit includes a first bottom bracket, a crank axle, and a first motor. The first bottom bracket is configured to be coupled to a first axial end of a bottom bracket shell of a bicycle. The crank axle is rotatably supported by the first bottom bracket with respect to a rotational axis. The crank axle has a first end portion and a second end portion. The first motor includes a first casing non-rotatably coupled to the crank axle, a second casing non-rotatably coupled to the bottom bracket shell, a first rotor having a first magnet disposed on the first casing, and a first stator non-rotatably coupled to the first bottom bracket. The first magnet and the first stator radially face with each other with respect to the rotational axis of the crank axle.

19 Claims, 6 Drawing Sheets

BICYCLE DRIVE UNIT

BACKGROUND

1. Field of the Invention

This invention generally relates to a bicycle drive unit. More specifically, the present invention relates to a bicycle drive unit with a motor.

2. Background Information

Electrically assisted bicycles are conventionally well known that use a motor output as assisting power (see DE 195 22 419 A1 (Patent Citation 1), DE 196 29 788 A1 (Patent Citation 2), for example). In the electrically assisted bicycles, a pedaling force is combined with a drive force from the motor, and then the combined drive force is transmitted to the rear wheel. Specifically, Patent Citation 1 illustrates an electric drive in which a stator is attached to a bottom bracket attachment portion of a bicycle, and a rotor with a crank arm is attached to a crank axle. Patent Citation 2 illustrates a drive unit in which a stator is fixed to a bicycle frame of a bicycle, and a rotor is coupled to a crank arm.

SUMMARY

Generally, the present disclosure is directed to a bicycle drive unit. In one feature, the bicycle drive unit can be attached to a bottom bracket shell of a bicycle and generate relatively larger assisting force.

In accordance with a first aspect, a bicycle drive unit includes a first bottom bracket, a crank axle, and a first motor. The first bottom bracket is configured to be coupled to a first axial end of a bottom bracket shell of a bicycle. The crank axle is rotatably supported by the first bottom bracket with respect to a rotational axis. The crank axle has a first end portion and a second end portion. The first motor includes a first casing non-rotatably coupled to the crank axle, a second casing non-rotatably coupled to the bottom bracket shell, a first rotor having a first magnet disposed on the first casing, and a first stator non-rotatably coupled to the first bottom bracket. The first magnet and the first stator radially face with each other with respect to the rotational axis of the crank axle.

In accordance with a second aspect, the bicycle drive unit according to the first aspect, further includes an output member attachment disposed on an outer peripheral surface of a peripheral portion of the first casing.

In accordance with a third aspect, with the bicycle drive unit according to the first aspect, the first magnet is fixedly attached to an inner peripheral surface of a peripheral portion of the first casing with an adhesive.

In accordance with a fourth aspect, the bicycle drive unit according to the second aspect, further includes an output member detachably coupled to the output member attachment such that the first motor transmits a rotational output to the output member.

In accordance with a fifth aspect, with the bicycle drive unit according to the fourth aspect, the output member is a chain ring that is detachably coupled to the output member attachment with a fastener.

In accordance with a sixth aspect, with the bicycle drive unit according to the first aspect, the first bottom bracket has an external thread portion that is configured to be threadedly coupled to an internal thread portion of the bottom bracket shell.

In accordance with a seventh aspect, with the bicycle drive unit according to the first aspect, the crank axle is coupled to the first casing.

In accordance with an eighth aspect, with the bicycle drive unit according to the seventh aspect, the first casing has serrations that are non-rotatably and detachably coupled to the crank axle.

In accordance with a ninth aspect, the bicycle drive unit according to the first aspect, further includes a first crank arm detachably coupled to the first end portion of the crank axle.

In accordance with a tenth aspect, with the bicycle drive unit according to the first aspect, the first motor further has a seal between the first casing and the second casing to define a sealed space.

In accordance with an eleventh aspect, the bicycle drive unit according to the first aspect, further includes a second bottom bracket, and a second motor. The second bottom bracket is configured to be coupled to a second axial end of the bottom bracket shell. The second axial end of the bottom bracket shell is opposite the first axial end. The crank axle is rotatably supported by the second bottom bracket. The second motor includes a third casing non-rotatably coupled to the crank axle, a fourth casing non-rotatably coupled to the second bottom bracket, a second rotor having a second magnet disposed on the third casing, and a second stator non-rotatably coupled to the second bottom bracket.

In accordance with a twelfth aspect, with the bicycle drive unit according to the eleventh aspect, the second motor transmits a rotational output via the crank axle.

In accordance with a thirteenth aspect, with the bicycle drive unit according to the first aspect, the first casing has a magnet housing part that houses the first magnet within an inside space of the magnet housing part, and the second casing has a stator housing part that houses the first stator within an inside space of the stator housing part.

In accordance with a fourteenth aspect, with the bicycle drive unit according to the thirteenth aspect, the magnet housing part of the first casing and the stator housing part of the second casing are made of a non-magnetism material.

In accordance with a fifteenth aspect, with the bicycle drive unit according to the first aspect, the first stator has a stator tooth fixedly attached to the first bottom bracket and a coil wire that is wound around the stator tooth.

In accordance with a sixteenth aspect, the bicycle drive unit according to the first aspect, further includes a bearing unit rotatably supporting the crank axle with respect to the first bottom bracket.

In accordance with a seventeenth aspect, with the bicycle drive unit according to the first aspect, the first motor is a three phase DC motor.

In accordance with an eighteenth aspect, the bicycle drive unit according to the eleventh aspect, further includes a second crank arm detachably coupled to the second end portion of the crank axle.

In accordance with a nineteenth aspect, a bicycle drive unit includes a bottom bracket, a crank axle, and a motor. The bottom bracket is configured to be coupled to a bottom bracket shell of a bicycle. The crank axle is rotatably supported by the bottom bracket with respect to a rotational axis. The motor includes a first casing non-rotatably coupled to the crank axle, a second casing non-rotatably coupled to the bottom bracket shell, a rotor having first and second magnets disposed on the first casing, and a stator non-rotatably coupled to the bottom bracket. The first casing has a first axial facing surface and a second axial facing surface. The first and second axial facing surfaces axially face with each other with respect to the rotational axis of the crank axle. The first magnet is disposed on the first axial facing surface of the first casing such that the first magnet and the stator axially face with each other with respect to the rotational axis of the crank axle. The second magnet is disposed on the second axial facing surface of the first casing such that the second magnet and the stator axially face with each other with respect to the rotational axis of the crank axle.

Other objects, features, aspects and advantages of the disclosed bicycle drive unit will become apparent to those skilled in the art from the following detailed description, which, taken in conjunction with the annexed drawings, discloses preferred embodiments of the bicycle drive unit.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
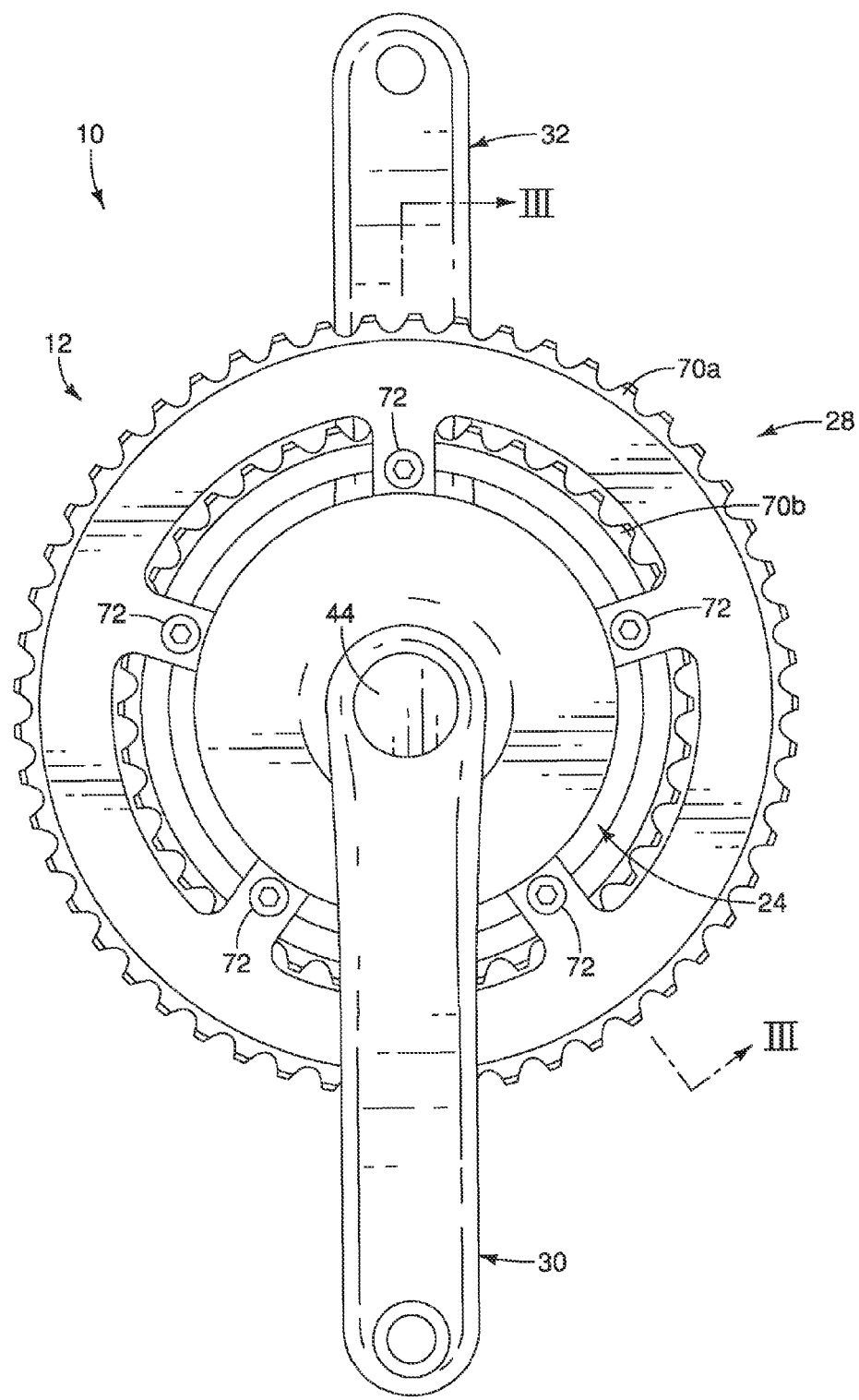
FIG. 1 is a side elevational view of a bicycle drive unit with a motor in accordance with a first embodiment.
Figure 3:
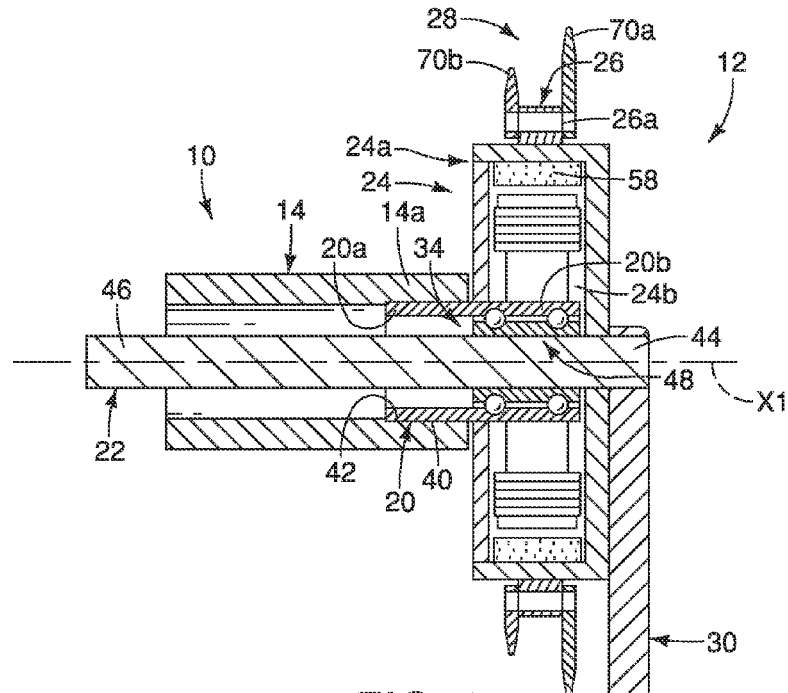
FIG. 3 is a cross sectional view of the bicycle drive unit illustrated in FIG. 1, taken along III-III line in FIG. 1.

Referring initially to FIG. 1, a right side elevational view of a drive train of an electrically assisted bicycle 10 (e.g., a bicycle) is illustrated that includes a bicycle drive unit 12 in accordance with a first embodiment. As best shown in FIG. 3, the bicycle drive unit 12 basically includes a first bottom bracket 20, a crank axle 22, and a motor 24 (e.g., a first motor). In the illustrated embodiment, as shown in FIGS. 1 and 3, the bicycle drive unit 12 further includes a plurality of output member attachments 26, an output member 28, a first crank arm 30, a second crank arm 32, and a bearing unit 34.

In the illustrated embodiment, a pair of pedals (not shown) is rotatably mounted to the free ends of the first and second crank arms 30 and 32, respectively. The inner ends of the first and second crank arms 30 and 32 are fixed to opposite ends of the crank axle 22, respectively. The output member 28 is non-rotatably mounted with respect to the crank axle 22. A rear sprocket (not shown) is mounted on a rear hub axle of a rear wheel in a conventional manner.

With the bicycle drive unit 12, a pedaling force acting on the pedals is transmitted to the rear sprocket rotatably disposed around the rear hub axle of the rear wheel via a chain. Specifically, the pedaling force from the first and second crank arms 30 and 32 is transmitted to the output member 28 via the crank axle 22. Furthermore, a rotational output of the motor 24 is transmitted from the motor 24 to the output member 28. In the illustrated embodiment, the bicycle drive unit 12 combines the pedaling force with the rotational output of the motor 24 as assisting power to assist a rider in riding the bicycle 10.

In the illustrated embodiment, the bicycle drive unit 12 detects the force corresponding to the torque acting on the crank axle 22 by a torsion sensor unit. In this bicycle drive unit 12, when the detected value is over a preset level, the motor 24 is turned on to generate a torque as the assisting power corresponding to the pedaling force. Of course, it will be apparent to those skilled in the art from this disclosure that the motor 24 can be controlled based on a detected value detected by a torque sensor, a force sensor or other sensors. The bicycle drive unit 12 is arranged near a connecting part between a lower end portion of a seat tube of the bicycle frame and a rear end portion of a down tube of the bicycle frame. Specifically, in the illustrated embodiment, the bicycle drive unit 12 is attached to a bottom bracket shell 14 of the bicycle frame of the bicycle 10. A battery (not shown) is arranged along the rear carrier, the down tube or the seat tube for supplying a driving power to the motor 24.

Figure 2:
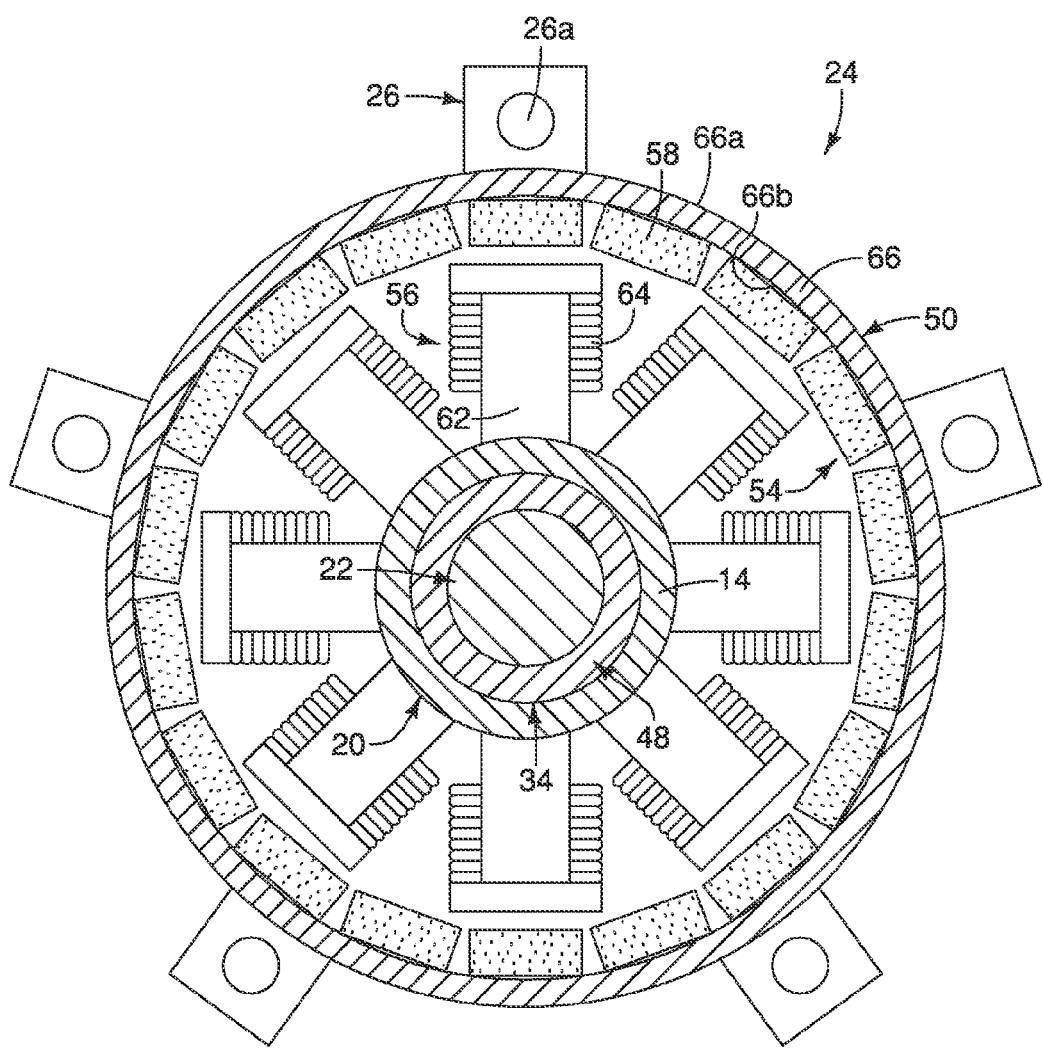
FIG. 2 is a cross sectional view of the motor of the bicycle drive unit illustrated in FIG. 1.

As illustrated in FIG. 2, with the bicycle drive unit 12, the rotational axis of the crank axle 22 and the rotational axis of the motor 24 are coaxially arranged with each other. Hereinafter, this coincident rotational axis is referred to as a rotational axis X1 of the bicycle drive unit 12.

As shown in FIG. 3, the first bottom bracket 20 is a cylindrical member through which the crank axle 22 extends. The first bottom bracket 20 rotatably supports the crank axle 22 with respect to the bottom bracket shell 14 of the bicycle 10 via the bearing unit 34. Specifically, the first bottom bracket 20 is configured to be coupled to a first axial end 14a of the bottom bracket shell 14 of the bicycle 10. The first bottom bracket 20 has an external thread portion 40 that is configured to be threadedly coupled to an internal thread portion 42 of the bottom bracket shell 14. In the illustrated embodiment, the external thread portion 40 is formed on an outer peripheral surface of a first axial end portion 20a of the first bottom bracket 20. With this configuration, the first bottom bracket 20 is non-rotatably and threadedly coupled to the bottom bracket shell 14. However, it will be apparent to those skilled in the art from this disclosure that the first bottom bracket 20 can be coupled to the bottom bracket shell 14 in a different conventional manner. Furthermore, the first bottom bracket 20 has a second axial end portion 20b that is axially opposite the first end portion 20a. In the illustrated embodiment, the first axial end portion 20a is housed within the bottom bracket shell 14, while the second axial end portion 20b is axially disposed outside of the bottom bracket shell 14. Alternatively or additionally, the bicycle drive unit 12 can also includes a second bottom bracket (not shown) coupled to a second axial end of the bottom bracket shell 14 that is opposite the first axial end 14a. The second bottom bracket is identical to the first bottom bracket 20, except that the second bottom bracket is mirror-symmetrically arranged with respect to the first bottom bracket 20 relative to the bottom bracket shell 14. The second bottom bracket can also rotatably support the crank axle 22 via a bearing unit (not shown) at axially spaced location from the bearing unit 34. Of course, it will be apparent to those skilled in the art from this discloser that the first bottom bracket 20 can be integrally formed with the second bottom bracket. The first bottom bracket 20 can be made of a material conventionally used for bicycle bottom brackets, such as aluminum, steel and the like.

As shown in FIG. 3, the crank axle 22 is inserted through the bottom bracket shell 14 of the bicycle 10. The crank axle 22 is rotatably supported by the first bottom bracket 20 with respect to the rotational axis X1. Specifically, the crank axle 22 is rotatably supported with respect to the bottom bracket shell 14 via the bearing unit 34. The crank axle 22 has a first end portion 44 and a second end portion 46. As illustrated in FIGS. 1 and 3, the first and second crank arms 30 and 32 are detachably attached to the first and second end portions 44 and 46, respectively, such that the first and second crank arms 30 and 32 are arranged axial outside of the bottom bracket shell 14. In the illustrated embodiment, the first and second crank arms 30 and 32 are detachably coupled to the first and second end portions 44 and 46, respectively, in a conventional manner, such as press fitting, threading, welding and the like. Alternatively or optionally, one of the first and second crank arms 30 and 32 can be non-detachably coupled to the crank axle 22. For example, the first crank arm 30 can be integrally formed with the crank axle 22 as a one-piece, unitary member. The crank axle 22 can be made of a material conventionally used for bicycle crank axles, such as aluminum, steel and the like.

As shown in FIGS. 2 and 3, the motor 24 has a center through hole 48 through which the crank axle 22 extends. The center through hole 48 is arranged at the rotational center portion of the motor 24. The motor 24 is arranged such that its rotational axis is coaxial with the rotational axis of the crank axle 22. The motor 24 includes a first casing 50, a second casing 52, a rotor 54 (e.g., a first rotor), and a stator 56 (e.g., a first stator). Basically, the crank axle 22 is coupled to the first casing 50. Specifically, the first casing 50 is non-rotatably coupled to the crank axle 22. The second casing 52 is non-rotatably coupled to the bottom bracket shell 14. The rotor 54 has a plurality of magnets 58 (e.g., first magnets) disposed on the first casing 50. The stator 56 is non-rotatably coupled to the first bottom bracket 20. The stator 56 (e.g., the first stator) has a plurality of stator teeth 62 fixedly attached to the first bottom bracket 20 and a plurality of coil wires 64 that is wound around the stator teeth 62. The magnets 58 and the stator teeth 62 of the stator 56 radially face with each other with respect to the rotational axis X1 of the crank axle 22. In the illustrated embodiment, the motor 24 is a three phase DC motor. Of course, it will be apparent to those skilled in the art from this disclosure that the motor 24 can be other type of brushless or brushed DC motors. In the illustrated embodiment, as shown in FIGS. 2 and 3, the motor 24 is an outer rotor motor. In other words, the motor 24 has an outer rotor assembly that is radially outwardly disposed with respect to an inner stator assembly.

Figure 4:
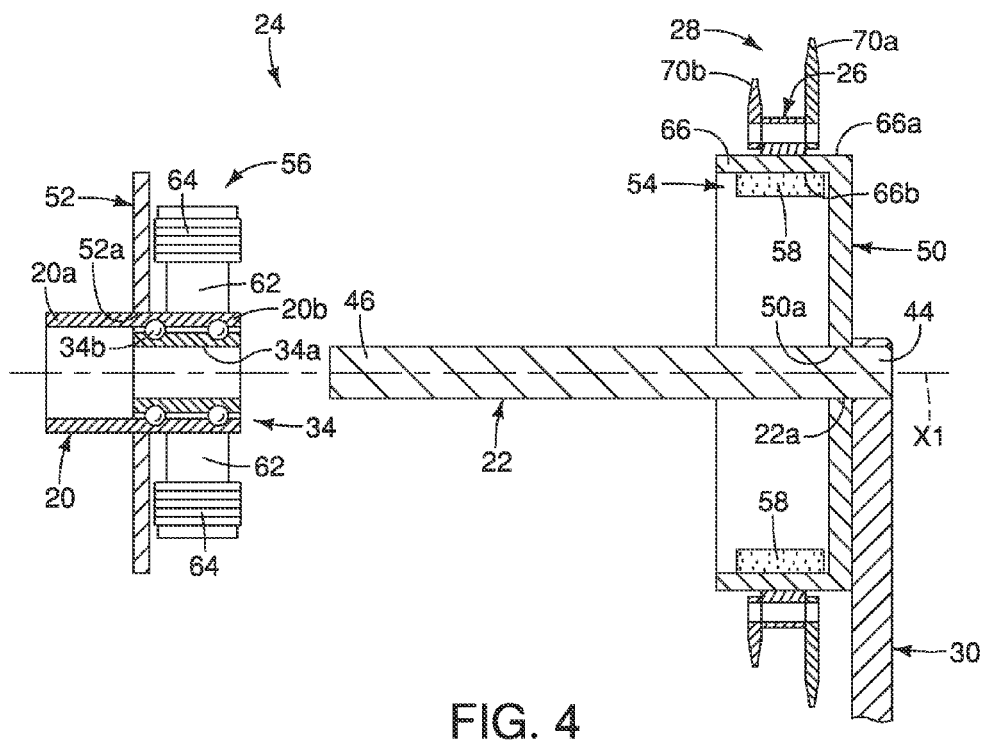
FIG. 4 is an exploded cross sectional view of the bicycle drive unit illustrated in FIG. 3.

As shown in FIG. 4, the first casing 50 is generally a cup-shaped member with a peripheral portion or sidewall 66. The first casing 50 has a center through hole with serrations 50a. The serrations 50a of the first casing 50 are non-rotatably and detachably coupled to the crank axle 22. Specifically, the crank axle 22 extends through the center through hole of the first casing 50 such that serration grooves 22a of the crank axle 22 mesh with the serrations 50a of the first casing 50. Thus, the first casing 50 is non-rotatably coupled to the crank axle 22 such that the rotation of the crank axle 22 can be directly transmitted to the first casing 50. The crank axle 22 extends through the first casing 50 such that the first end portion 44 axially protrudes outside the first casing 50. The second end portion 46 of the crank axle 22 axially protrudes outside the bottom bracket shell 14. In the illustrated embodiment, the crank axle 22 is fixedly coupled to the first casing 50 with the coupling between the serration grooves 22a and the serrations 50a. Of course, it will be apparent to those skilled in the art from this disclosure that the crank axle 22 can be non-rotatably coupled to the first casing 50 in a different manner, such as press fitting, threading, welding and the like. Furthermore, alternatively, the crank axle 22 can be integrally formed with the first casing 50 as a one-piece, unitary member. The first casing 50 can be made of a material conventionally used for motor casings, such as aluminum, steel and the like.

As shown in FIG. 4, the second casing 52 is generally a disk-shaped member. The second casing 52 has a center through hole 52a through which the first bottom bracket 20 is disposed. The second casing 52 is non-rotatably coupled to the bottom bracket shell 14. Specifically, the second casing 52 is non-rotatably and fixedly coupled to an axial middle portion of the first bottom bracket 20 between the first and second axial end portions 20a and 20b. Thus, the second casing 52 is stationary with respect to the first bottom bracket 20 while the first casing 50 rotates about the rotational axis X1. In the illustrated embodiment, the second casing 52 is fixedly coupled to the first bottom bracket 20 in a conventional manner, such as press fitting, threading, welding and the like. Alternatively, the second casing 52 can be integrally formed with the first bottom bracket 20 as a one-piece, unitary member. The second casing 52 can be made of a material conventionally used for motor casings, such as aluminum, steel and the like. The second casing 52 has a diameter that is substantially equal to or slightly smaller than an inner diameter of the peripheral portion 66 of the first casing 50. Thus, as illustrated in FIG. 3, the second casing 52 is radially inwardly arranged with respect to the peripheral portion 66 of the first casing 50 while the second casing 52 is axially aligned to an edge of the peripheral portion 66 of the first casing 50. Furthermore, in the illustrated embodiment, the motor 24 further has a seal 24a between the first casing 50 and the second casing 52 to define a sealed space 24b. The seal 24a can be a waterproof grease, such as silicone grease, a wheel or ring seal, such as an O-ring, and the like. Thus, the rotor 54 and the stator 56 are arranged within the sealed space 24b in a waterproof manner.

As shown in FIGS. 2 and 4, the magnets 58 of the rotor 54 are fixedly attached to an inner peripheral surface 66b of the peripheral portion 66 of the first casing 50 with an adhesive. Specifically, as shown in FIG. 2, the magnets 58 are circumferentially arranged along the inner peripheral surface 66b of the peripheral portion 66. In the illustrated embodiment, the rotor 54 has eighteen magnets 58. However, of course, the rotor 54 can have more than or less than eighteen magnets 58. The rotor 54 is rotatably supported with respect to the stator 56. Specifically, the rotor 54 is radially outwardly arranged with respect to the stator 56 relative to the rotational axis X1, thereby forming an outer rotor-type motor.

As shown in FIGS. 2 and 4, the stator teeth 62 of the stator 56 are circumferentially arranged along an outer peripheral surface of the second axial end portion 20b of the first bottom bracket 20. In the illustrated embodiment, the stator 56 has eight stator teeth 62. However, of course, the stator 56 can have more than or less than eight stator teeth 62. The stator teeth 62 are fixedly coupled to the second axial end portion 20b of the first bottom bracket 20. The coil wires 64 are wound around the stator teeth 62, respectively, in a conventional manner.

In the illustrated embodiment, the motor 24 is driven by an inverter (not shown) that is driven by a motor controller (not shown). The motor controller controls the inverter according to the pedaling force and the speed of the bicycle. More specifically, the motor controller is electrically connected to the stator 56, and can be disposed with the stator 56 in the sealed space 24b. Since the motor 24 is the outer rotor-type motor, a driving torque of the motor 24 can be made higher. Alternatively or optionally, the motor 24 can be configured without a moderator. Thus, the weight of the motor 24 can be made lighter.

As shown in FIGS. 2 to 4, the output member attachments 26 are disposed on an outer peripheral surface 66a of the peripheral portion 66 of the first casing 50. The output member attachments 26 are circumferentially arranged along the outer peripheral surface 66a of the peripheral portion 66 at equal intervals therebetween. The output member attachments 26 are securely coupled to the outer peripheral surface 66a of the peripheral portion 66 with adhesive or any other suitable manner such that the output member attachments 26 rotate together with the first casing 50. In the illustrated embodiments, five of the output member attachments 26 are fixedly coupled to the first casing 50. However, the number of the output member attachments 26 can be more than or less than five as needed and/or desired. The output member attachments 26 have through holes 26a, respectively. The output member 28 is detachably coupled to the output member attachments 26 such that the motor 24 transmits a rotational output to the output member 28. The output member 28 includes first and second chain rings 70a and 70b (e.g., chain rings) that are detachably coupled to the output member attachments 26 with fasteners 72 (see FIG. 1). In the illustrated embodiment, as shown in FIGS. 3 and 4, the first and second chain rings 70a and 70b are detachably coupled to the output member attachments 26 such that the output member attachments 26 are axially disposed between the first and second chain rings 70a and 70b. In the illustrated embodiment, the fasteners 72 are disposed through attachment holes of the first and second chain rings 70a and 70b and the through holes 26a of the output member attachments 26. The fasteners 72 fasten the first and second chain rings 70a and 70b to the output member attachments 26, thereby securely fastening the first and second chain rings 70a to the first casing 50 of the motor 24. Thus, the first and second chain rings 70a and 70b rotate integrally with the first casing 50 of the motor 24 and the crank axle 22. The fasteners 72 include conventional fastening members for fastening conventional chain rings to a conventional bicycle crank arm. Thus, detailed description of the fasteners 72 will be omitted for the sake of brevity. However, in the illustrated embodiment, each of the fasteners 72 includes a pair of bolt and nut. Thus, with this bicycle drive unit 12, the first and second chain rings 70a and 70b are freely replaceable.

In the illustrated embodiment, the first crank arm 30 is detachably coupled to the first end portion 44 of the crank axle 22, while the second crank arm 32 (see FIG. 1) is detachably coupled to the second end portion 46 of the crank axle 22. The first and second crank arms 30 and 32 can be conventional bicycle crank arms, and can be non-rotatably coupled to the crank axle 22 in a conventional manner. Alternatively or optionally, the first crank arm 30 can be fixedly coupled to an axially outside surface of the first casing 50, or can be integrally formed with the first casing 50 as a one-piece, unitary member.

As shown in FIGS. 3 and 4, the bearing unit 34 rotatably supports the crank axle 22 with respect to the first bottom bracket 20. Specifically, the bearing unit 34 is radially disposed between the crank axle 22 and the first bottom bracket 20. In particular, the bearing unit 34 is disposed on an inner peripheral surface of the second axial end portion 20b of the first bottom bracket 20. Furthermore, as mentioned above, the bicycle drive unit 12 can include additional bearing unit. The crank axle 22 is rotatably supported by the bearing unit 34 and the additional bearing unit that are axially arranged with an interval along the rotational axis X1 such that the crank axle 22 rotate about the rotational axis X1 with respect to the bottom bracket shell 14. The bearing unit 34 and the additional bearing unit are conventional bearing units that include ball or roller bearings. Specifically, as shown in FIG. 4, the bearing unit 34 includes a cylindrical inner race 34a and a plurality of balls or rollers 34b. The inner race 34a is disposed inside the first bottom bracket 20 at the second axial end portion 20b of the first bottom bracket 20. The inner race 34a is fixedly and non-rotatably coupled to the crank axle 22. The balls 34b are disposed between the inner race 34a and the second axial end portion 20b of the first bottom bracket 20. The balls 34b rotatably support the inner race 34a with respect to the first bottom bracket 20, thereby rotatably supporting the crank axle 22 with respect to the first bottom bracket 20. With the bearing unit 34, the first bottom bracket 20 serves as an outer race of the bearing unit 34. However, it will be apparent to those skilled in the art from this disclosure that the bearing unit 34 can include an outer race as a separate member from the first bottom bracket 20.

With the bicycle drive unit 12, the pedaling force acting on the first and second crank arms 30 and 32 is transmitted to the output member 28 via the crank axle 22 and the first casing 50. Furthermore, the rotational output of the motor 24 is transmitted from the motor 24 to the output member 28 via the first casing 50. In the illustrated embodiment, the first casing 50 of the motor 24 combines the pedaling force from the first and second crank arms 30 and 32 with the rotational output of the motor 24 as assisting power to assist a rider in riding the bicycle 10. Specifically, a rotational output of the output member 28 is transmitted to the rear sprocket rotatably disposed around the rear hub axle of the rear wheel via the chain. Alternatively or additionally, the bicycle drive unit 12 can also include a gear mechanism for combining the pedaling force with the rotational output of the motor 24.

With the bicycle drive unit 12, the rotational axis of the crank axle 22 and the rotational axis of the motor 24 are arranged coaxial with each other. Thus, the bicycle drive unit 12 can be made more compact.

The bicycle drive unit 12 can be attached to the bicycle 10 by merely threadedly fastening the first bottom bracket 20 to the bottom bracket shell 14 of the bicycle 10. Thus, the bicycle drive unit 12 can be easily installed to a conventional bicycle frame. Furthermore, The bicycle drive unit 12 is easily detachable from the bottom bracket shell 14 of the bicycle 10, which makes maintenance of the bicycle drive unit 12 easier.

With the bicycle drive unit 12, the rotor 54 and the stator 56 radially face with each other. Thus, the motor 24 can generate larger torque.

In the illustrated embodiment, the rotational output of the motor 24 is directly transmitted to the output member 28 without speed reduction. However, the motor 24 can include a reduction gear unit that changes the rotational speed of the motor 24 prior to being combined with the pedaling force from the first and second crank arms 30 and 32.

Second Embodiment

Figure 5:
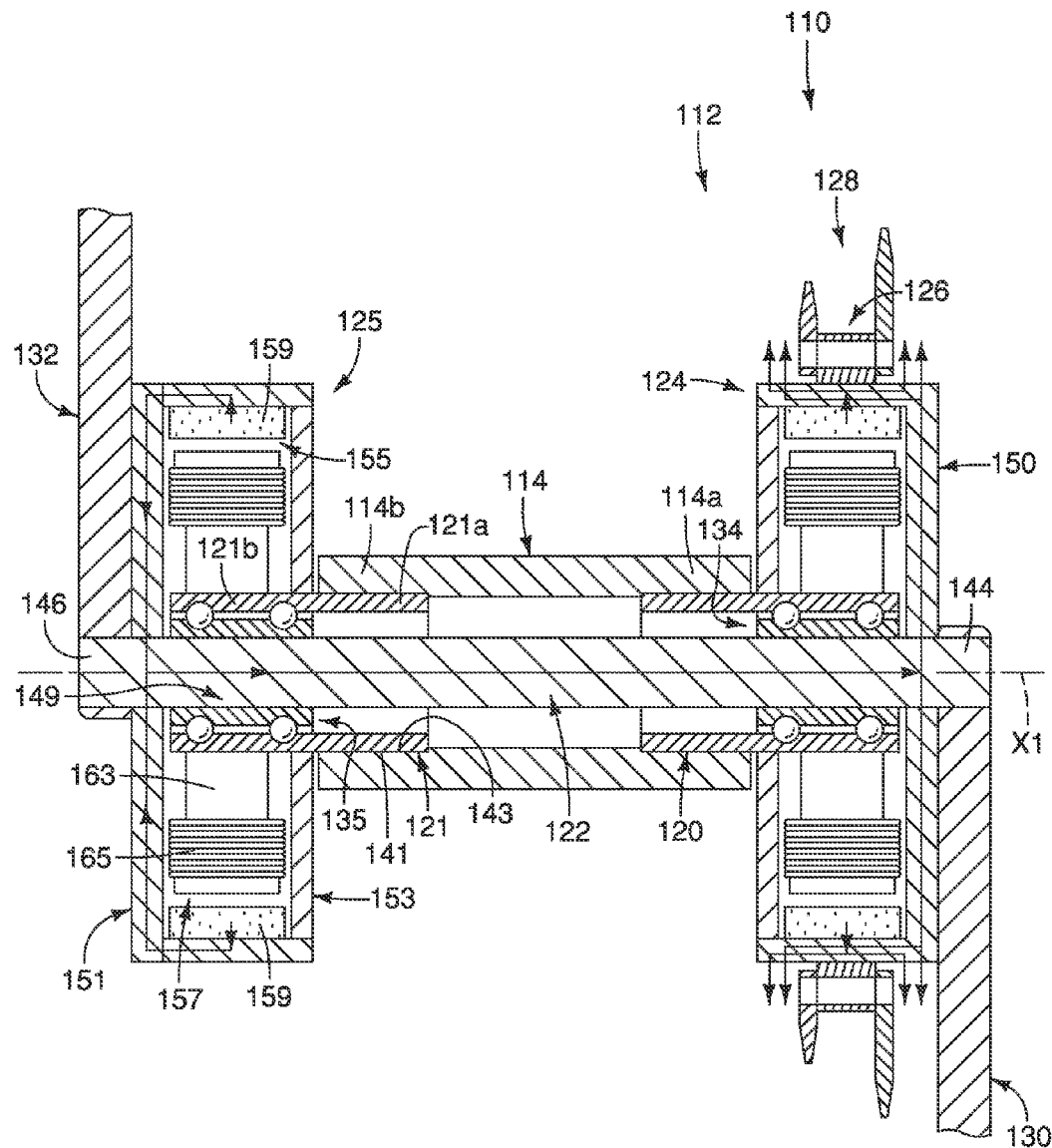
FIG. 5 is a cross sectional view of a bicycle drive unit with a pair of motors in accordance with a second embodiment.

Referring now to FIG. 5, a bicycle drive unit 112 in accordance with a second embodiment will now be explained. The bicycle drive unit 112 is basically identical to the bicycle drive unit 12, except that the bicycle drive unit 112 includes a pair of motors attached to both axial end of a crank axle, as explained below. The bicycle drive unit 112 is attached to a bottom bracket shell 114 of a bicycle frame of a bicycle 110. The bottom bracket shell 114 is substantially identical to the bottom bracket shell 14 in accordance with the first embodiment.

In view of the similarity between the first and second embodiments, the parts of the second embodiment that are identical to the parts of the first embodiment will be given the same reference numerals as the parts of the first embodiment. Also, parts of this second embodiment that are functionally identical and/or substantially identical to parts of the first embodiment will be given the same reference numerals but with "100" added thereto. In any event, the descriptions of the parts of the second embodiment that are substantially identical to the parts of the first embodiment may be omitted for the sake of brevity. However, it will be apparent to those skilled in the art from this disclosure that the descriptions and illustrations of the first embodiment also apply to this second embodiment, except as discussed and/or illustrated herein.

As illustrated in FIG. 5, the bicycle drive unit 112 basically includes a first bottom bracket 120, a crank axle 122, and a first motor 124. Furthermore, the bicycle drive unit 112 includes a plurality of output member attachments 126, an output member 128, a first crank arm 130, a second crank arm 132, and a bearing unit 134. In the illustrated embodiment, the first bottom bracket 120, the crank axle 122, the first motor 124, the output member attachments 126, the output member 128, the first crank arm 130, the second crank arm 132, and the bearing unit 134 are substantially identical to the first bottom bracket 20, the crank axle 22, the motor 24, the output member attachments 26, the output member 28, the first crank arm 30, the second crank arm 32, and the bearing unit 34 in accordance with the first embodiment, respectively. Thus, detailed description of these parts will be omitted for the sake of brevity.

The bicycle drive unit 112 further includes a second bottom bracket 121, and a second motor 125. In the illustrated embodiment, the bicycle drive unit 112 also includes a bearing unit 135. With the bicycle drive unit 112, the rotational axis of the crank axle 122, the rotational axis of the first motor 124, and the rotational axis of the second motor 125 are coaxially arranged with each other. Hereinafter, this coincident rotational axis is referred to as a rotational axis X1 of the bicycle drive unit 112.

As shown in FIG. 5, the first bottom bracket 120 is configured to be coupled to a first axial end 114a of the bottom bracket shell 114, while the second bottom bracket 121 is configured to be coupled to a second axial end 114b of the bottom bracket shell 114. The second axial end 114b of the bottom bracket shell 114 is opposite the first axial end 114a along the rotational axis X1 of the bicycle drive unit 112. The second bottom bracket 121 is substantially identical to the first bottom bracket 120. The second bottom bracket 121 is mirror-symmetrically arranged with respect to the first bottom bracket 120. Thus, detailed description of the second bottom bracket 121 will be omitted for the sake of brevity. The second bottom bracket 121 rotatably supports the crank axle 122 with respect to the bottom bracket shell 114 of the bicycle 110 via the bearing unit 135. Specifically, as illustrated in FIG. 5, the second bottom bracket 121 has an external thread portion 141 that is configured to be threadedly coupled to an internal thread portion 143 of the bottom bracket shell 114. In the illustrated embodiment, the external thread portion 141 is formed on an outer peripheral surface of a first axial end portion 121a of the second bottom bracket 121. With this configuration, the second bottom bracket 121 is non-rotatably and threadedly coupled to the bottom bracket shell 114. However, it will be apparent to those skilled in the art from this disclosure that the second bottom bracket 121 can be coupled to the bottom bracket shell 114 in a different conventional manner. Furthermore, the second bottom bracket 121 has a second axial end portion 121b that is axially opposite the first axial end portion 121a. In the illustrated embodiment, the first axial end portion 121a is housed within the bottom bracket shell 14, while the second axial end portion 121b is axially disposed outside of the bottom bracket shell 14. The second bottom bracket 121 can be made of a material conventionally used for bicycle bottom brackets, such as aluminum, steel and the like.

The crank axle 122 is rotatably supported by the second bottom bracket 121. The crank axle 122 is substantially identical to the crank axle 22 in accordance with the first embodiment, but can be longer than the crank axle 22 for axially arranging the second motor 125 between the bottom bracket shell 114 and the second crank arm 132. As illustrated in FIG. 5, the crank axle 122 axially extends through the first motor 124, the first bottom bracket 120, the bottom bracket shell 114, the second bottom bracket 121, and the second motor 125. The crank axle 122 has a first end portion 144 and a second end portion 146 that axially protrude outside the first motor 124 and the second motor 125, respectively. The first crank arm 130 is detachably coupled to the first end portion 144 of the crank axle 122, while the second crank arm 132 is detachably coupled to the second end portion 146 of the crank axle 122. In the illustrated embodiment, the first and second crank arms 130 and 132 are detachably coupled to the first and second end portions 144 and 146, respectively, in a conventional manner, such as press fitting, threading, welding and the like. Alternatively or optionally, one of the first and second crank arms 130 and 132 can be non-detachably coupled to the crank axle 122. For example, the first crank arm 130 can be integrally formed with the crank axle 122 as a one-piece, unitary member. The crank axle 122 can be made of a material conventionally used for bicycle crank axles, such as aluminum, steel and the like.

As shown in FIG. 5, the second motor 125 has a center through hole 149 through which the crank axle 122 extends. The center through hole 149 is arranged at the rotational center portion of the second motor 125. The second motor 125 is arranged such that its rotational axis is coaxial with the rotational axis of the crank axle 122. The second motor 125 is substantially identical to the first motor 124, and thus identical to the motor 24 in accordance with the first embodiment. The second motor 125 is mirror-symmetrically arranged with respect to the first motor 124 relative to the bottom bracket shell 114. Thus, the detailed description of the second motor 125 will be omitted for the sake of brevity. The second motor 125 includes all the features of the motor 24 and the first motor 124, except that the output member attachments 26 and 126 for attaching the output members 28 and 128 are not provided to the second motor 125.

The second motor 125 includes a third casing 151, a fourth casing 153, a second rotor 155, and a second stator 157. The third casing 151 is non-rotatably coupled to the crank axle 122. The fourth casing 153 is non-rotatably coupled to the second bottom bracket 121. The second rotor 155 has a plurality of (e.g., eighteen) second magnets 159 disposed on the third casing 151. The second stator 157 is non-rotatably coupled to the second bottom bracket 121. The second stator 157 has a plurality of (e.g., eight) stator teeth 163 fixedly attached to the second bottom bracket 121 and a plurality of coil wires 165 that is wound around the stator teeth 163. The second magnets 159 and the stator teeth 163 of the second stator 157 radially face with each other with respect to the rotational axis X1 of the crank axle 122. In the illustrated embodiment, the third casing 151, the fourth casing 153, the second rotor 155, and the second stator 157 are substantially identical to the first casing 50, the second casing 52, the rotor 54, and the stator 56 in accordance with the first embodiment. Thus, detailed descriptions will be omitted for the sake of brevity. Furthermore, the second magnets 159 of the second rotor 155, and the stator teeth 163 and the coil wires 165 of the second stator 157 are also substantially identical to the magnets 58 of the rotor 54, and the stator teeth 62 and the coil wires 64 of the stator 56 in accordance with the first embodiment. Thus, detailed descriptions will be omitted for the sake of brevity. In the illustrated embodiment, the first and second motors 124 and 125 are a three phase DC motor. Of course, it will be apparent to those skilled in the art from this disclosure that the first and second motors 124 and 125 can be other type of brushless or brushed DC motors. In the illustrated embodiment, the first and second motors 124 and 125 are an outer rotor motor. In other words, the first and second motors 124 and 125 have an outer rotor assembly that is radially outwardly disposed with respect to an inner stator assembly.

In the illustrated embodiment, the first and second motors 124 and 125 are driven by an inverter (not shown) that is driven by a motor controller (not shown). The motor controller controls the inverter according to the pedaling force and the speed of the bicycle. More specifically, the motor controller is electrically connected to the first and second motors 124 and 125.

With the bicycle drive unit 112, the pedaling force acting on the first and second crank arms 130 and 132 is transmitted to the output member 128 via the crank axle 122 and a first casing 150 of the first motor 124. On the other hand, the rotational output of the first motor 124 is transmitted from the first motor 124 to the output member 128 via the first casing 150 as indicated by arrows in FIG. 5. Furthermore, the second motor 125 transmits a rotational output via the crank axle 122. Specifically, the rotational output of the second motor 125 is transmitted from the second motor 125 to the output member 128 via the third casing 151, the crank axle 122, and the first casing 150 as indicated by arrows in FIG. 5. In the illustrated embodiment, the first casing 150 of the first motor 124 combines the pedaling force from the first and second crank arms 130 and 132 with the rotational output of the first and second motors 124 and 125 as assisting power to assist a rider in riding the bicycle 110. Specifically, a rotational output of the output member 128 is transmitted to the rear sprocket rotatably disposed around the rear hub axle of the rear wheel via the chain. Alternatively or additionally, the bicycle drive unit 112 can also include a gear mechanism for combining the pedaling force with the rotational outputs of the first and second motors 124 and 125.

With the bicycle drive unit 112, since the first and second motors 124 and 125 are provided for generating the assisting power, larger assisting power can be obtained or each of the first and second motors 124 and 125 can be made smaller for generating the same assisting power.

Third Embodiment

Figure 6:
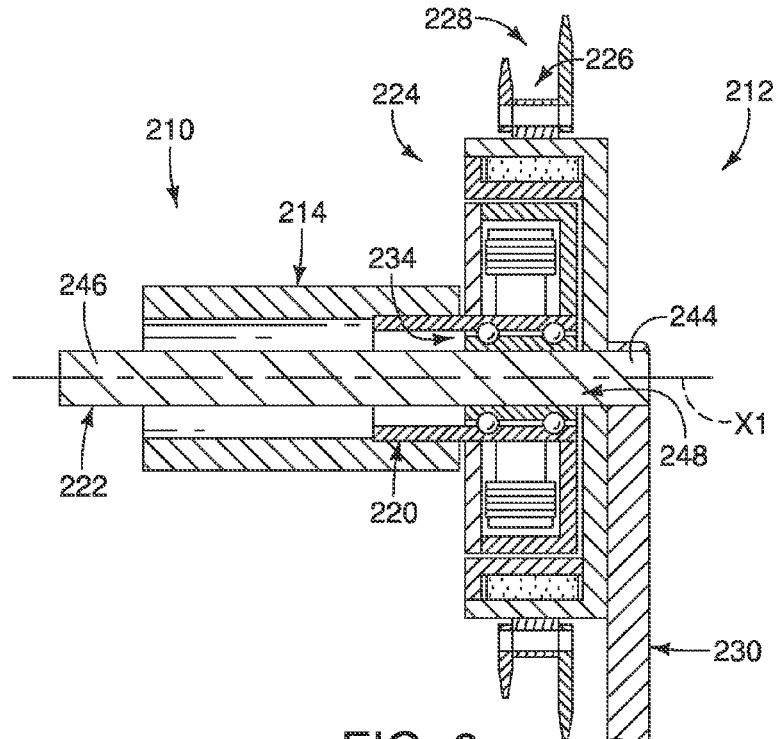
FIG. 6 is a cross sectional view of a bicycle drive unit with a motor in accordance with a third embodiment.
Figure 7:
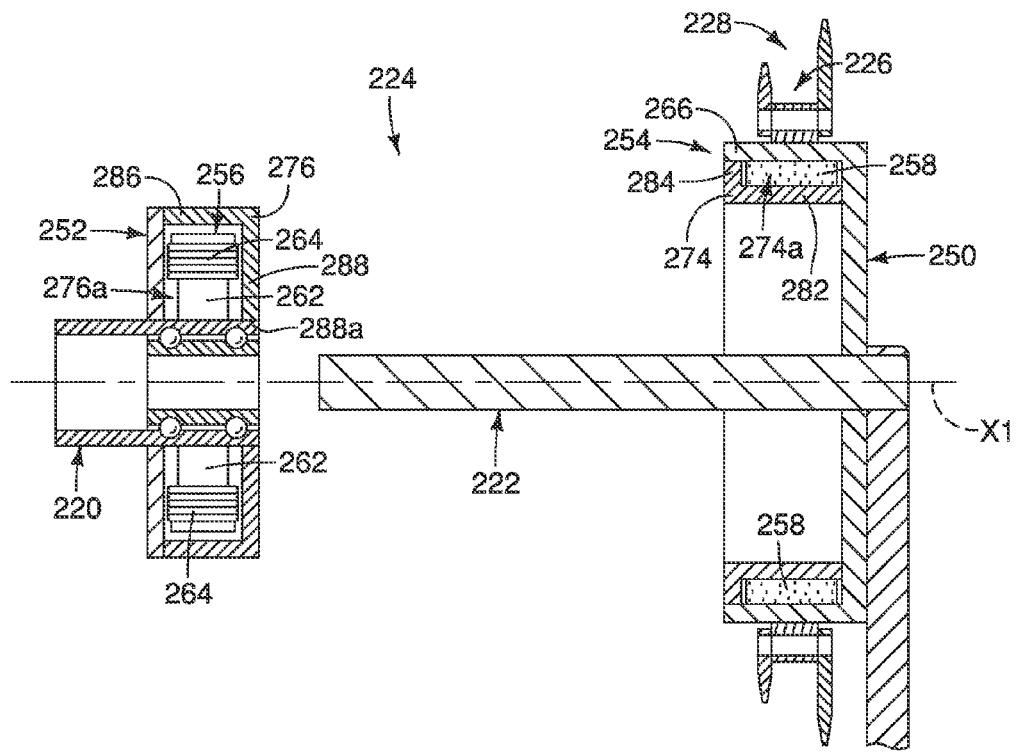
FIG. 7 is an exploded cross sectional view of the bicycle drive unit illustrated in FIG. 6.

Referring now to FIGS. 6 and 7, a bicycle drive unit 212 in accordance with a third embodiment will now be explained. The bicycle drive unit 212 is basically identical to the bicycle drive unit 12, except that the bicycle drive unit 212 includes a rotor and a stator housed in sealed spaces, respectively, as explained below. The bicycle drive unit 212 is attached to a bottom bracket shell 214 of a bicycle frame of a bicycle 210. The bottom bracket shell 214 is substantially identical to the bottom bracket shell 14 in accordance with the first embodiment.

In view of the similarity between the first and third embodiments, the parts of the third embodiment that are identical to the parts of the first embodiment will be given the same reference numerals as the parts of the first embodiment. Also, parts of this third embodiment that are functionally identical and/or substantially identical to parts of the first embodiment will be given the same reference numerals but with "200" added thereto. In any event, the descriptions of the parts of the third embodiment that are substantially identical to the parts of the first embodiment may be omitted for the sake of brevity. However, it will be apparent to those skilled in the art from this disclosure that the descriptions and illustrations of the first embodiment also apply to this third embodiment, except as discussed and/or illustrated herein.

As illustrated in FIG. 6, the bicycle drive unit 212 basically includes a first bottom bracket 220, a crank axle 222, and a motor 224. Furthermore, the bicycle drive unit 212 includes a plurality of output member attachments 226, an output member 228, a first crank arm 230, a second crank arm (not shown), and a bearing unit 234. The first bottom bracket 220, the crank axle 222, the output member attachments 226, the output member 228, the first crank arm 230, the second crank arm, and the bearing unit 234 are substantially identical to the first bottom bracket 20, the crank axle 22, the output member attachments 26, the output member 28, the first crank arm 30, the second crank arm 32, and the bearing unit 34 in accordance with the first embodiment, respectively. Thus, detailed description of these parts will be omitted for the sake of brevity. In the illustrated embodiment, the first bottom bracket 220 is coupled to a first axial end of the bottom bracket shell 214. Alternatively or additionally, the bicycle drive unit 212 can also includes a second bottom bracket (not shown) coupled to a second axial end of the bottom bracket shell 214 that is opposite the first axial end. The second bottom bracket is identical to the first bottom bracket 220, except that the second bottom bracket is mirror-symmetrically arranged with respect to the first bottom bracket 220 relative to the bottom bracket shell 214. The second bottom bracket can also rotatably support the crank axle 222 via a bearing unit (not shown) at axially spaced location from the bearing unit 234. In the illustrated embodiment, the first crank arm 230 is detachably coupled to a first end portion 244 of the crank axle 222, while the second crank arm is detachably coupled to a second end portion 246 of the crank axle 222.

As illustrated in FIG. 7, the motor 224 is basically identical to the motor 24 in accordance with the first embodiment, except for the features as explained below. With the bicycle drive unit 212, the rotational axis of the crank axle 222 and the rotational axis of the motor 224 are coaxially arranged with each other. Hereinafter, this coincident rotational axis is referred to as a rotational axis X1 of the bicycle drive unit 212. In the illustrated embodiment, the motor 224 has a center through hole 248 through which the crank axle 222 extends. The center through hole 248 is arranged at the rotational center portion of the motor 224. The motor 224 is arranged such that its rotational axis is coaxial with the rotational axis of the crank axle 222. As shown in FIG. 7, the motor 224 includes a first casing 250, a second casing 252, a rotor 254 (e.g., a first rotor), and a stator 256 (e.g., a first stator). Basically, the crank axle 222 is coupled to the first casing 250. Specifically, the first casing 250 is non-rotatably coupled to the crank axle 222. The second casing 252 is non-rotatably coupled to the bottom bracket shell 214. The rotor 254 has a plurality of magnets 258 (e.g., first magnets) disposed on the first casing 250. The stator 256 is non-rotatably coupled to the first bottom bracket 220. The stator 256 (e.g., the first stator) has a plurality of stator teeth 262 fixedly attached to the first bottom bracket 220 and a plurality of coil wires 264 that is wound around the stator teeth 262. The magnets 258 and the stator teeth 262 of the stator 256 radially face with each other with respect to the rotational axis X1 of the crank axle 222. In the illustrated embodiment, the motor 224 is a three phase DC motor. Of course, it will be apparent to those skilled in the art from this disclosure that the motor 224 can be other type of brushless or brushed DC motors. In the illustrated embodiment, the motor 224 is an outer rotor motor. In other words, the motor 224 has an outer rotor assembly that is radially outwardly disposed with respect to an inner stator assembly.

In the illustrated embodiment, as shown in FIG. 7, the first casing 250 has a magnet housing part 274, while the second casing 252 has a stator housing part 276. The magnet housing part 274 houses the magnets 258 (e.g., first magnets) within an inside space 274a of the magnet housing part 274. The stator housing part 276 houses the stator 56 (e.g., first stator) within an inside space 276a of the stator housing part 276. In the illustrated embodiment, the magnet housing part 274 of the first casing 250 and the stator housing part 276 of the second casing 252 are made of a non-magnetism material.

As shown in FIG. 7, the first casing 250 is substantially identical to the first casing 50 in accordance with the first embodiment, except that the first casing 250 further has the magnet housing part 274. The magnet housing part 274 is basically an annular member 282 with a flange 284 at an axial end of the annular member 282. The annular member 282 axially extends along the rotational axis X1 of the bicycle drive unit 212, while the flange 284 radially outwardly extends from the axial end of the annular member 282. The magnet housing part 274 is fixedly coupled to a peripheral portion 266 of the first casing 250 with an adhesive. In the illustrated embodiment, the flange 284 has an outer diameter that is substantially equal or slightly smaller than an inner diameter of the peripheral portion 266 of the first casing 250. Furthermore, the annular member 282 has an axial dimension that is substantially equal to an inner depth of the first casing 250 measured along the rotational axis X1 of the bicycle drive unit 212. Of course, it will be apparent to those skilled in the art from this disclosure that the magnet housing part 274 can be coupled to the first casing 250 in a different manner, such as press fitting, threading, welding and the like. The magnet housing part 274 is radially inwardly disposed on the peripheral portion 266 with respect to the peripheral portion 266 to define the annular inside space 274a of the magnet housing part 274 therebetween about the rotational axis X1 of the bicycle drive unit 212. The inside space 274a is a sealed space for housing the magnets 258 therewithin in a waterproof manner. The magnets 258 of the rotor 254 are identical to the magnets 58 of the rotor 54 in accordance with the first embodiment. The detailed description will be omitted for the sake of brevity.

As shown in FIG. 7, the second casing 252 is substantially identical to the second casing 52 in accordance with the first embodiment, except that the second casing 252 further has the stator housing part 276. The stator housing part 276 is basically an annular member 286 with a bottom 288 at an axial end of the annular member 286. The annular member 286 axially extends along the rotational axis X1 of the bicycle drive unit 212, while the bottom 288 radially inwardly extends from the axial end of the annular member 286. The stator housing part 276 is fixedly coupled to the second casing 252 with an adhesive. In the illustrated embodiment, the annular member 286 of the stator housing part 276 has an outer diameter that is slightly smaller than an inner diameter of the annular member 282 of the magnet housing part 274. Thus, as illustrated in FIG. 6, the magnet housing part 274 and the stator housing part 276 radially face with each other. Specifically, the stator housing part 276 is radially inwardly arranged with respect to the magnet housing part 274. Furthermore, in the illustrated embodiment, the bottom 288 has a center through hole 288a through which the first bottom bracket 220 is disposed. The center through hole 288a has an inner diameter that is substantially equal or slightly larger than an outer diameter of the first bottom bracket 220. Of course, it will be apparent to those skilled in the art from this disclosure that the stator housing part 276 can be coupled to the second casing 252 in a different manner, such as press fitting, threading, welding and the like. The stator housing part 276 is radially outwardly disposed on the first bottom bracket 220 to define the annular inside space 276a of the stator housing part 276 about the rotational axis X1 of the bicycle drive unit 212. The inside space 276a is a sealed space for housing the stator 256 therewithin in a waterproof manner. The stator 256 is identical to the stator 56 in accordance with the first embodiment. The detailed description will be omitted for the sake of brevity.

With the bicycle drive unit 212, the pedaling force acting on the first crank arm 230 and the second crank arm is transmitted to the output member 228 via the crank axle 222 and the first casing 250. Furthermore, the rotational output of the motor 224 is transmitted from the motor 224 to the output member 228 via the first casing 250. In the illustrated embodiment, the first casing 250 of the motor 224 combines the pedaling force with the rotational output of the motor 224 as assisting power to assist a rider in riding the bicycle 210. Specifically, a rotational output of the output member 228 is transmitted to the rear sprocket rotatably disposed around the rear hub axle of the rear wheel via the chain. Alternatively or additionally, the bicycle drive unit 212 can also include a gear mechanism for combining the pedaling force with the rotational output of the motor 224.

In the illustrated embodiment, the shapes of the magnet housing part 274 and the stator housing part 276 are not limited to the shapes as shown in FIG. 7 as long as the magnet housing part 274 houses the magnets 258 within the inside space 274a of the magnet housing part 274, and the stator housing part 276 houses the stator 56 within the inside space 276a of the stator housing part 276. Furthermore, in the illustrated embodiment, the magnet housing part 274 is independently formed as a separate part. However, the magnet housing part 274 can be integrally formed with the first casing 250 as a one-piece, unitary member. Moreover, in the illustrated embodiment, the stator housing part 276 is independently formed as a separate part. However, the stator housing part 276 can be integrally formed with the second casing 252 as a one-piece, unitary member.

Furthermore, in the illustrated embodiment, the magnet housing part 274 of the first casing 250 and the stator housing part 276 of the second casing 252 are made of a non-magnetism material, such as copper, aluminum or other non-magnetism metal, synthetic resin, and the like. Of course, it will be apparent to those skilled in the art from this disclosure that the first casing 250 and the second casing 252 can be also made of the non-magnetism material.

Fourth Embodiment

Figure 8:
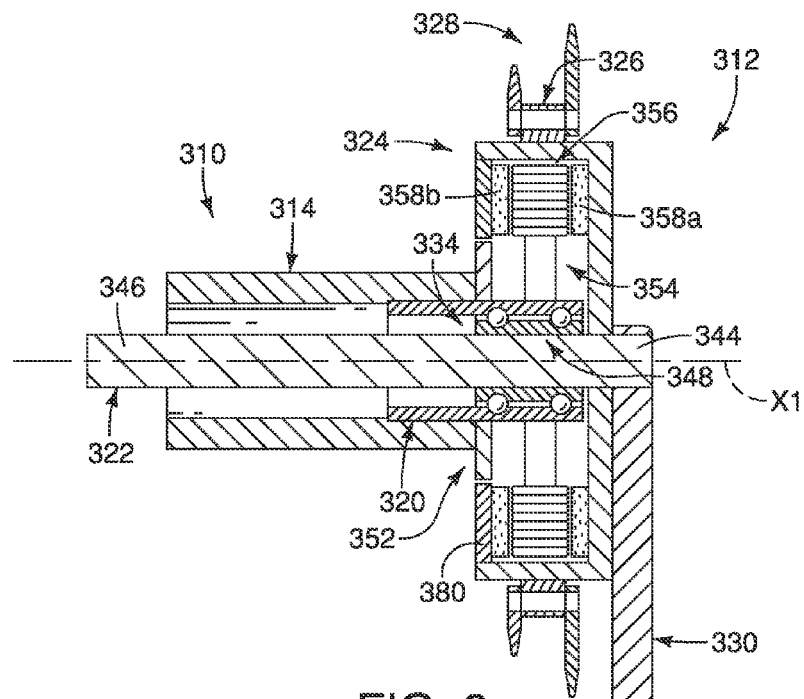
FIG. 8 is a cross sectional view of a bicycle drive unit with a motor in accordance with a fourth embodiment.
Figure 9:
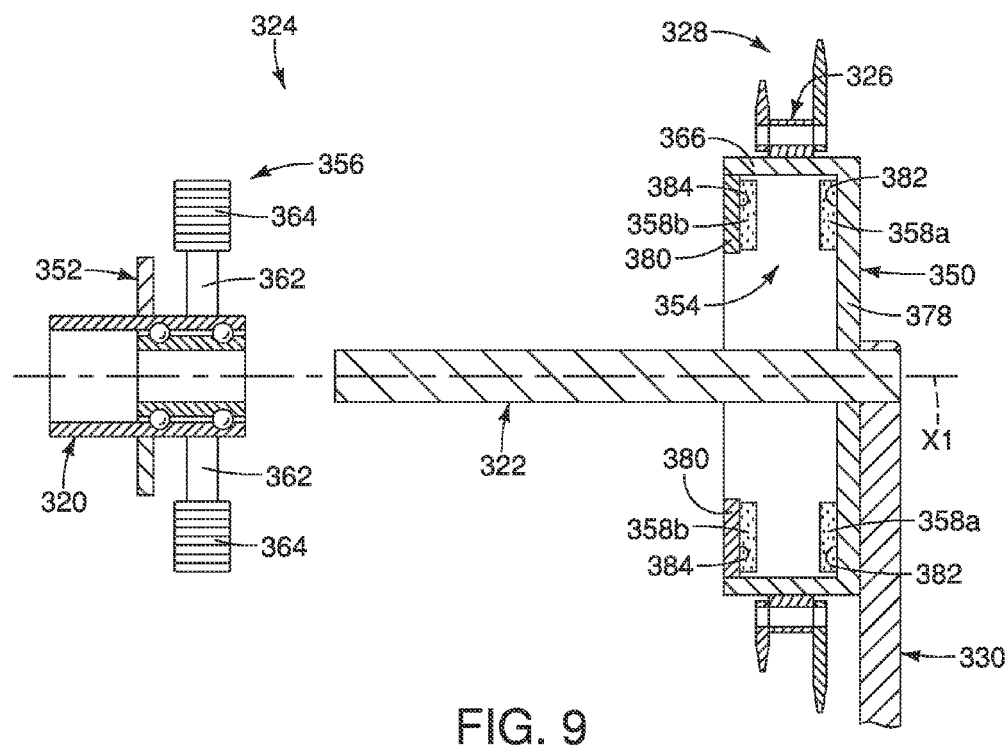
FIG. 9 is an exploded cross sectional view of the bicycle drive unit illustrated in FIG. 8.

Referring now to FIGS. 8 and 9, a bicycle drive unit 312 in accordance with a fourth embodiment will now be explained. The bicycle drive unit 312 is basically identical to the bicycle drive unit 12, except that the bicycle drive unit 312 includes a rotor and a stator axially facing with each other, as explained below. The bicycle drive unit 312 is attached to a bottom bracket shell 314 of a bicycle frame of a bicycle 310. The bottom bracket shell 314 is substantially identical to the bottom bracket shell 14 in accordance with the first embodiment.

In view of the similarity between the first and fourth embodiments, the parts of the fourth embodiment that are identical to the parts of the first embodiment will be given the same reference numerals as the parts of the first embodiment. Also, parts of this fourth embodiment that are functionally identical and/or substantially identical to parts of the first embodiment will be given the same reference numerals but with "300" added thereto. In any event, the descriptions of the parts of the fourth embodiment that are substantially identical to the parts of the first embodiment may be omitted for the sake of brevity. However, it will be apparent to those skilled in the art from this disclosure that the descriptions and illustrations of the first embodiment also apply to this fourth embodiment, except as discussed and/or illustrated herein.

As illustrated in FIG. 8, the bicycle drive unit 312 basically includes a first bottom bracket 320 (e.g., a bottom bracket), a crank axle 322, and a motor 324. Furthermore, the bicycle drive unit 312 includes a plurality of output member attachments 326, an output member 328, a first crank arm 330, a second crank arm (not shown), and a bearing unit 334. The first bottom bracket 320, the crank axle 322, the output member attachments 326, the output member 328, the first crank arm 330, the second crank arm, and the bearing unit 334 are substantially identical to the first bottom bracket 20, the crank axle 22, the output member attachments 26, the output member 28, the first crank arm 30, the second crank arm 32, and the bearing unit 34 in accordance with the first embodiment, respectively. Thus, detailed description of these parts will be omitted for the sake of brevity. In the illustrated embodiment, the first bottom bracket 320 is configured to be coupled to the bottom bracket shell 314 of the bicycle 310. Specifically, the first bottom bracket 320 is coupled to a first axial end of the bottom bracket shell 314. Furthermore, the crank axle 322 is rotatably supported by the first bottom bracket 320 via the bearing unit 334. Alternatively or additionally, the bicycle drive unit 312 can also includes a second bottom bracket (not shown) coupled to a second axial end of the bottom bracket shell 314 that is opposite the first axial end. The second bottom bracket is identical to the first bottom bracket 320, except that the second bottom bracket is mirror-symmetrically arranged with respect to the first bottom bracket 320 relative to the bottom bracket shell 314. The second bottom bracket can also rotatably support the crank axle 322 via a bearing unit (not shown) at axially spaced location from the bearing unit 334. In the illustrated embodiment, the first crank arm 330 is detachably coupled to a first end portion 344 of the crank axle 322, while the second crank arm is detachably coupled to a second end portion 346 of the crank axle 322.

As illustrated in FIG. 9, the motor 324 is basically identical to the motor 24 in accordance with the first embodiment, except for the features as explained below. With the bicycle drive unit 312, the rotational axis of the crank axle 322 and the rotational axis of the motor 324 are coaxially arranged with each other. Hereinafter, this coincident rotational axis is referred to as a rotational axis X1 of the bicycle drive unit 312. In the illustrated embodiment, the crank axle 322 is rotatably supported by the first bottom bracket 320 with respect to the rotational axis X1. As shown in FIG. 9, in the illustrated embodiment, the motor 324 has a center through hole 348 through which the crank axle 322 extends. The center through hole 348 is arranged at the rotational center portion of the motor 324. The motor 324 is arranged such that its rotational axis is coaxial with the rotational axis of the crank axle 322. As shown in FIG. 9, the motor 324 includes a first casing 350, a second casing 352, a rotor 354, and a stator 356. Basically, the crank axle 322 is coupled to the first casing 350. Specifically, the first casing 350 is non-rotatably coupled to the crank axle 322. The second casing 352 is non-rotatably coupled to the bottom bracket shell 314. The rotor 354 has a plurality of first magnets 358a and a plurality of second magnets 358b disposed on the first casing 350. The stator 356 is non-rotatably coupled to the first bottom bracket 320. The stator 356 has a plurality of stator teeth 362 fixedly attached to the first bottom bracket 320 and a plurality of coil wires 364 that is wound around the stator teeth 362. In the illustrated embodiment, the motor 324 is a three phase DC motor. Of course, it will be apparent to those skilled in the art from this disclosure that the motor 324 can be other type of brushless or brushed DC motors.

As shown in FIG. 9, the first casing 350 is substantially identical to the first casing 50 in accordance with the first embodiment, except that the first casing 350 further has a second side wall 380 that is coupled to a peripheral portion 366 of the first casing 350 such that the second side wall 380 axially faces with a first side wall 378 of the first casing 350. The second side wall 380 is basically an annular disk-shaped plate. The second side wall 380 is fixedly coupled to an axial end of the peripheral portion 366 that axially extends from the first side wall 378. In the illustrated embodiment, the second side wall 380 is fixedly coupled to the peripheral portion 366 of the first casing 350 with an adhesive. Of course, it will be apparent to those skilled in the art from this disclosure that the second side wall 380 can be coupled to the first casing 350 in a different manner, such as press fitting, threading, welding and the like. In the illustrated embodiment, the second side wall 380 has an outer diameter that is substantially equal or slightly smaller than an inner diameter of the peripheral portion 366 of the first casing 350.

In the illustrated embodiment, as shown in FIG. 9, the first side wall 378 has a first axial facing surface 382, while the second side wall 380 has a second axial facing surface 384. In other words, the first casing 350 has the first axial facing surface 382 and the second axial facing surface 384. The first and second axial facing surfaces 382 and 384 axially face with each other with respect to the rotational axis X1 of the crank axle 322. In the illustrated embodiment, as shown in FIGS. 8 and 9, the first magnets 358a are disposed on the first axial facing surface 382 of the first casing 350 such that the first magnets 358a and the stator 356 axially face with each other with respect to the rotational axis X1 of the crank axle 322. Furthermore, the second magnets 358b are disposed on the second axial facing surface 384 of the first casing 350 such that the second magnets 358b and the stator 356 axially face with each other with respect to the rotational axis X1 of the crank axle 322. Specifically, as shown in FIG. 8, the stator 356 is axially disposed between the first magnets 358a and the second magnets 358b. The first magnets 358a are circumferentially arranged on the first axial facing surface 382 along the peripheral portion 366 with respect to the rotational axis X1, while the second magnets 358b are circumferentially arranged on the second axial facing surface 384 along the peripheral portion 366 with respect to the rotational axis X1. In the illustrated embodiment, the rotor 354 has eighteen of the first magnets 358a and eighteen of the second magnets 358b. However, of course, the number of the first magnets 358a and the number of the second magnets 358b can be more than or less than eighteen. In the illustrated embodiment, the second side wall 380 is independently formed as a separate part. However, the second side wall 380 can be integrally formed with the first casing 350 as a one-piece, unitary member.

As shown in FIG. 9, the second casing 352 is substantially identical to the second casing 52 in accordance with the first embodiment, except for the size of the second casing 352. Thus, detailed description will be omitted for the sake of brevity. In the illustrated embodiment, the second casing 352 is dimensioned such that the second casing 352 is radially inwardly arranged with respect to the second side wall 380 of the first casing 350. Specifically, the second casing 352 has an outer diameter that is slightly smaller than an inner diameter of a center through hole of the second side wall 380. Thus, as illustrated in FIG. 9, the second casing 352 can be arranged with respect to the second side wall 380 such that the second casing 352 and the second side wall 380 radially face with each other. The stator 356 is identical to the stator 56 in accordance with the first embodiment. The detailed description will be omitted for the sake of brevity.

With the bicycle drive unit 312, the pedaling force acting on the first crank arm 330 and the second crank arm is transmitted to the output member 328 via the crank axle 322 and the first casing 350. Furthermore, the rotational output of the motor 324 is transmitted from the motor 324 to the output member 328 via the first casing 350. In the illustrated embodiment, the first casing 350 of the motor 324 combines the pedaling force with the rotational output of the motor 324 as assisting power to assist a rider in riding the bicycle 310. Specifically, a rotational output of the output member 328 is transmitted to the rear sprocket rotatably disposed around the rear hub axle of the rear wheel via the chain. Alternatively or additionally, the bicycle drive unit 312 can also include a gear mechanism for combining the pedaling force with the rotational output of the motor 324.

In the illustrated embodiment, alternatively or additionally, the motor 324 can include a seal radially between the second side wall 380 of the first casing 50 and the second casing 352 to define a sealed space of the motor 324. The seal can be a waterproof grease, such as silicone grease, a wheel or ring seal, such as an O-ring, and the like. In this case, the rotor 354 and the stator 356 are arranged within the sealed space in a waterproof manner.

In understanding the scope of the present invention, the term "coupled" or "coupling", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e., one element is essentially part of the other element. This definition also applies to words of similar meaning, for example, "joined", "connected", "attached", "mounted", "bonded", "fixed" and their derivatives.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives.

Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired so long as they do not substantially their intended function. Components that are shown directly connected or contacting each other can have intermediate structures disposed between them unless specifically stated otherwise. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle drive unit comprising:
   a first bottom bracket configured to be coupled to a first axial end of a bottom bracket shell of a bicycle;
   a crank axle rotatably supported by the first bottom bracket with respect to a rotational axis, the crank axle having a first end portion and a second end portion; and
   a first motor including a first casing non-rotatably coupled to the crank axle, a second casing non-rotatably coupled to the bottom bracket shell, a first rotor having a first magnet disposed on the first casing, and a first stator non-rotatably coupled to the first bottom bracket,
   the first magnet and the first stator radially facing with each other with respect to the rotational axis of the crank axle.

2. The bicycle drive unit according to claim 1, further comprising an output member attachment disposed on an outer peripheral surface of a peripheral portion of the first casing.

3. The bicycle drive unit according to claim 2, further comprising
   an output member detachably coupled to the output member attachment such that the first motor transmits a rotational output to the output member.

4. The bicycle drive unit according to claim 3, wherein
   the output member is a chain ring that is detachably coupled to the output member attachment with a fastener.

5. The bicycle drive unit according to claim 1, wherein
   the first magnet is fixedly attached to an inner peripheral surface of a peripheral portion of the first casing with an adhesive.

6. The bicycle drive unit according to claim 1, wherein
   the first bottom bracket has an external thread portion that is configured to be threadedly coupled to an internal thread portion of the bottom bracket shell.

7. The bicycle drive unit according to claim 1, wherein
   the crank axle is coupled to the first casing.

8. The bicycle drive unit according to claim 7, wherein
   the first casing has serrations that are non-rotatably and detachably coupled to the crank axle.

9. The bicycle drive unit according to claim 1, further comprising;
a first crank arm detachably coupled to the first end portion of the crank axle.

10. The bicycle drive unit according to claim 1, wherein
the first motor further has a seal between the first casing and the second casing to define a sealed space.

11. The bicycle drive unit according to claim 1, further comprising
a second bottom bracket configured to be coupled to a second axial end of the bottom bracket shell, with the second axial end of the bottom bracket shell being opposite the first axial end, with the crank axle being rotatably supported by the second bottom bracket, and
a second motor including a third casing non-rotatably coupled to the crank axle, a fourth casing non-rotatably coupled to the second bottom bracket, a second rotor having a second magnet disposed on the third casing, and a second stator non-rotatably coupled to the second bottom bracket.

12. The bicycle drive unit according to claim 11, wherein the second motor transmits a rotational output via the crank axle.

13. The bicycle drive unit according to claim 11, further comprising;
a second crank arm detachably coupled to the second end portion of the crank axle.

14. The bicycle drive unit according to claim 1, wherein
the first casing has a magnet housing part that houses the first magnet within an inside space of the magnet housing part, and
the second casing has a stator housing part that houses the first stator within an inside space of the stator housing part.

15. The bicycle drive unit according to claim 14, wherein
the magnet housing part of the first casing and the stator housing part of the second casing are made of a non-magnetism material.

16. The bicycle drive unit according to claim 1, wherein
the first stator has a stator tooth fixedly attached to the first bottom bracket and a coil wire that is wound around the stator tooth.

17. The bicycle drive unit according to claim 1, further comprising
a bearing unit rotatably supporting the crank axle with respect to the first bottom bracket.

18. The bicycle drive unit according to claim 1, wherein
the first motor is a three phase DC motor.

19. A bicycle drive unit comprising:
a bottom bracket configured to be coupled to a bottom bracket shell of a bicycle;
a crank axle rotatably supported by the bottom bracket with respect to a rotational axis; and
a motor including a first casing non-rotatably coupled to the crank axle, a second casing non-rotatably coupled to the bottom bracket shell, a rotor having first and second magnets disposed on the first casing, and a stator non-rotatably coupled to the bottom bracket,
the first casing having a first axial facing surface and a second axial facing surface, the first and second axial facing surfaces axially facing with each other with respect to the rotational axis of the crank axle,
the first magnet being disposed on the first axial facing surface of the first casing such that the first magnet and the stator axially face with each other with respect to the rotational axis of the crank axle,
the second magnet being disposed on the second axial facing surface of the first casing such that the second magnet and the stator axially face with each other with respect to the rotational axis of the crank axle.

* * * * *